Patented May 6, 1941

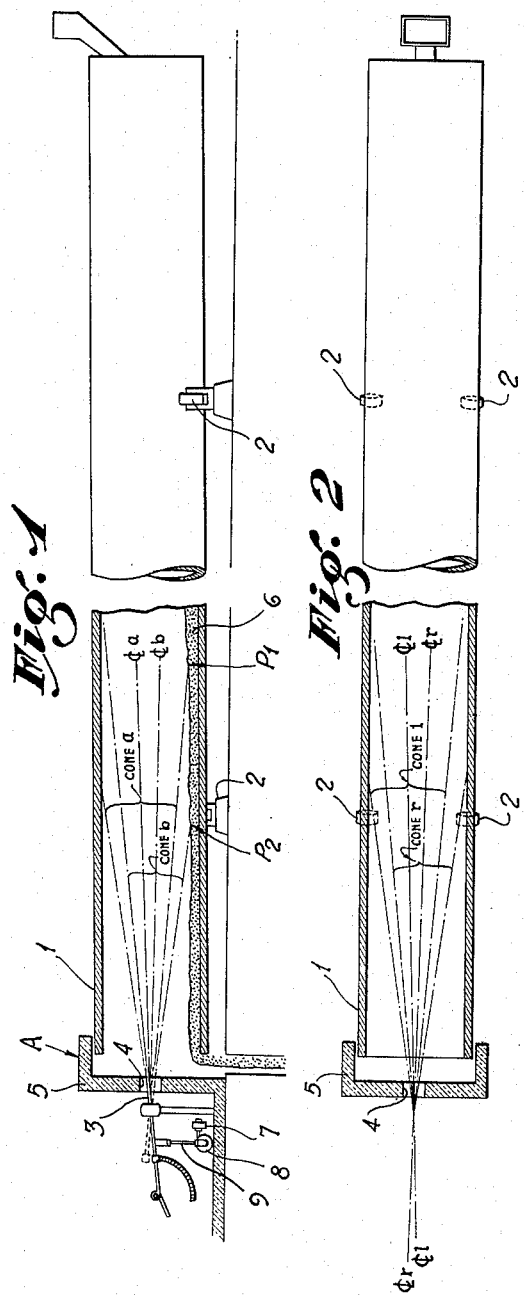

2,240,485

UNITED STATES PATENT OFFICE 2,240,485

METHOD OF FIRING ROTARY KILNS IN THE PRODUCTION OF PORTLAND CEMENT

Hugh M. Armel, Covina, Calif.

Application May 31, 1939, Serial No. 276,633

1 Claim. (Cl. 263—53)

This invention relates to the operation of rotary kilns of the cement kiln type, and pertains particularly to a method of firing a rotary kiln in the production of Portland cement clinker whereby formation of so-called "clinker rings" is substantially eliminated and other advantages are obtained.

This application is a continuation-in-part of my copending application Ser. No. 133,400, filed March 27, 1937.

In the firing of cement kilns of the rotary type, considerable difficulty is experienced with the formation of "clinker rings," apparently as the result of a temporary condition of overheating. In general, with an oil or gas fired kiln, these clinker rings will form about 30 feet from the firing end of the kiln, and are very difficultly removed. Several procedures have been heretofore employed for the actual removal of these rings after they are formed, but no satisfactory method has heretofore been developed whereby the formation of these rings may be substantially prevented.

According to the present invention, the firing of a cement kiln is conducted in such manner that the high temperature flame is caused to continuously shift axially or longitudinally of the rotary kiln with respect to the side wall portions thereof, in such manner as to prevent a localization of a high temperature condition at any one point in the length of the kiln. One of the particular objects of this invention is to provide a method of firing a cement kiln in the production of Portland cement clinker whereby the formation of objectionable clinker rings is substantially prevented.

A further object of the invention is to provide a method of firing cement kilns in which the firing flame is continuously shifted longitudinally of the kiln.

A further object of the invention is to provide a method of firing a cement kiln in which the firing flame is continuously moved with respect to the longitudinal axis of the kiln in an angular fashion, whereby the high temperature zone of the firing flame is caused, in effect, to shift axially along the length of the kiln.

The accompanying drawing illustrates the practice of the present invention, and shows certain apparatus which may be employed therein, and referring thereto:

Fig. 1 is a partly broken-away longitudinal view of a kiln, showing the firing end thereof in vertical section;

Fig. 2 is a view corresponding to Fig. 1, showing the firing end of the kiln in horizontal section;

Fig. 3 illustrates a form of apparatus which may be employed to carry out the process of the present invention; and Fig. 4 illustrates a transverse section of a rotary cement kiln, illustrating an alternative mode of operation which may be employed in the firing of a kiln in the production of Portland cement according to the present invention.

Referring to Fig. 1, a rotary kiln is indicated at 1, suitably supported on bearings 2 and inclined downwardly toward the discharge or firing end of the device indicated by the letter A. A suitable burner means, such as indicated at 3, is provided at the firing end of the device, preferably located adjacent the axis of the kiln 1 and extending through an aperture 4 in the end wall 5 of the kiln. In the form shown in Fig. 1 the burner 3 is adapted for angular movement to opposite sides of the axis of the kiln 1, between some such positions as are indicated by the center lines $a$ and $b$, such movement being in a generally vertical direction, i. e., adapted for oscillation in a generally vertical plane. The flame produced by the burner 3 may be considered to extend interiorly of the kiln in a generally conical shape, and the respective positions of the flame cone provided by the burner at the upper and lower limits of the angular movement thereof are represented at "cone $a$" and "cone $b$." A layer of material such as cement mixture is indicated at 6, and it will be seen that the lower limits of the uppermost cone $a$ will strike the clinker at a position $P_1$ which is further removed from the firing end of the kiln than the position $P_2$ at which the lower limit of the lower position of the cone (cone $b$) contacts such mixture, both positions $P_1$ and $P_2$ being removed from the firing end of said kiln. With the angular proportions indicated, the contact of the flame with the material undergoing firing will thus continuously shift between the positions $P_1$ and $P_2$ as the burner 3 is oscillated between the upper and lower cone positions. Movement of the burner 3 through the desired angle is conveniently obtained through the agency of a motor 7 driving a gear reducer 8 provided with a crank arm connected to a suitable link 9 which is attached to the pivotally mounted burner 3.

In Fig. 2 I have illustrated the center lines of the flame from the burner at $l$ and $r$, showing the axes adopted by the corresponding cones $l$ and $r$ when the burner means is shifted angularly with respect to the axis of the kiln 1 in a substantially horizontally plane. It will be appreciated that the direction of the flame from the burner means may be shifted along any desired path according to the type of operating means employed to cause such shifting, the result being substantially equivalent in each case, that is, due to the continuous shifting of the cone of the flame with respect to the axis of the rotary kiln, the outer portions of the cone are caused to contact the side portions of the kiln or the material contained therein at continuously varying positions spaced longitudinally of the kiln itself. It will be appreciated that other types of movement may be employed to secure the desired shifting of the flame cone with equivalent effect, as, for example, by shifting the flame between positions disposed wholly to one side of the longitudinal axis of the kiln.

In Fig. 3 I have illustrated the fire wall 5 and the opening 4 therein, with the burner 3 disposed within said opening. The burner 3 is provided with a suitable type of universal mounting as at 11, and is adapted for movement between positions indicated in full lines and dot-dash lines (having the indicated center lines), at opposite sides of the normal center line of the kiln indicated by the dot-dash line CL. The operating means comprising the motor 7, gear reducer 8, and connecting link 9 may be disposed at any desired position, so that the direction of movement of the burner means away from the center line CL may be obtained in any desired azimuth. It will be appreciated that flexible or other suitable connections for the oil, gas, or other fuel and air supply will be provided to the burner means 3.

In Figs. 1 and 2 I have illustrated the oscillation of the burner means as being in vertical and horizontal planes, respectively. In view of the fact that the rotation of the tubular rotary kiln causes the charge to "climb up" the ascending kiln wall, as is illustrated in Fig. 4, I may advantageously cause the flame to oscillate in a plane extending substantially axially of the kiln and substantially parallel to the surface of the charge. Referring to Fig. 4, a kiln tube is indicated at 21, provided with a refractory lining 22 constituting the kiln wall. The direction of rotation is indicated as clockwise, as by the arrow R, and the charge, indicated at 23, is seen to be carried up the ascending wall of the kiln so that the exposed surface 23a of the charge is inclined at an angle to the horizontal, this inclination being upwardly toward the upwardly moving side of the kiln. According to this invention, the combustion flame is caused to shift or oscillate in a plane extending substantially parallel to the general inclination of the exposed surface of the charge, as along the double-ended arrow S.

I am aware of the fact that attempts have hitherto been made, in connection with the operation of powdered fuel types of burners, to produce an advantageous condition of turbulence within the kiln, and means have been provided for adjusting the degree of turbulence to control the combustion, and thus indirectly control the formation of clinker rings. Such methods, being based upon the control of the degree of combustion of the powdered fuel, are limited to adjusting the turbulence of the combustion flame, and thus control of clinker ring formation is made at a sacrifice of fuel combustion efficiency. This method not only fails to insure that no rings will form, but causes difficulty from the standpoint of upsetting a desirable burning condition, with consequent danger of spoiling a portion of the burn. According to the present invention, a continuous movement of the effective heating flame is maintained longitudinally of the kiln, which prevents formation of such clinker rings without requiring constant supervision by the operator, and in the absence of factors disturbing the established combustion conditions. Furthermore, the method of the present invention insures a more uniform burning of the kiln, resulting in a more uniform product, and is thus applicable to calcining operations not actually requiring a clinkering condition.

It will further be appreciated that the period of oscillation of the burner means relative to the longitudinal axis of the kiln may be established at any desired value, although it appears preferable that this period be made at a variance to the period of rotation of the kiln, so that there will be no tendency for a localization of a high-temperature portion of the heating flame on a particular portion of the charge within the kiln.

I claim:

The method of firing a rotary kiln in the production of Portland cement clinker which comprises: introducing a Portland cement raw mix into the upper end of a downwardly inclined rotary kiln; rotating such kiln to cause said mix to travel longitudinally through said kiln; directing a combustion flame longitudinally into such kiln from adjacent the lower end thereof into contact with the material therein to cause the same to clinker, while changing the direction of such combustion flame angularly with respect to the longitudinal axis of such kiln to shift the contact of the flame with such material and cause the high temperature combustion zone of such flame to shift longitudinally of such kiln with respect to the side wall portions thereof, the direction of the combustion flame and the extent of the angular change in direction thereof being such as to cause said high temperature combustion zone to shift between spaced positions located along the length of such kiln and removed from both ends thereof, and withdrawing Portland cement clinker from the lower end of said kiln, the rotation of said kiln being such as to cause the charge of material undergoing firing to be carried up the ascending wall of the kiln, whereby the exposed surface thereof is inclined at an angle to the horizontal and the direction of introduction of the combustion flame being such as to cause such flame to oscillate in a plane extending substantially parallel to the general inclination of such exposed surface.

HUGH M. ARMEL.